United States Patent
Yokoi

(10) Patent No.: US 6,241,046 B1
(45) Date of Patent: Jun. 5, 2001

(54) MECHANICAL ARRANGEMENT FOR FEEDING FLUID AT A MINUTE FLOW RATE

(76) Inventor: Junichi Yokoi, 11-20 Wakae-Honmachi 2-chome, Higshi-Osaka City, Osaka-Fu (JP)

( * ) Notice: Subject to any disclaimer, the term of this patent is extended or adjusted under 35 U.S.C. 154(b) by 0 days.

(21) Appl. No.: 09/570,043

(22) Filed: May 12, 2000

Related U.S. Application Data

(62) Division of application No. 09/154,893, filed on Sep. 17, 1998, now Pat. No. 6,095,287.

(30) Foreign Application Priority Data

Sep. 17, 1997 (JP) .................................................. 9-252395

(51) Int. Cl.⁷ ...................................................... F01M 1/12
(52) U.S. Cl. .............................. 184/8; 184/7.1; 137/561 A
(58) Field of Search ................... 184/7.1, 8; 137/561 A; 239/548, 553

(56) References Cited

U.S. PATENT DOCUMENTS

| | | | |
|---|---|---|---|
| 4,299,553 | * 11/1981 | Swaroop | 137/561 A |
| 4,373,878 | * 2/1983 | Sauvaget | 418/23 |
| 4,580,597 | * 4/1986 | Cordingley et al. | 137/561 A |
| 4,583,941 | * 4/1986 | Elperin et al. | 239/548 |
| 4,598,749 | * 7/1986 | Mandekic | 137/561 A |
| 5,182,082 | * 1/1993 | Monthony et al. | 137/561 A |
| 5,205,376 | 4/1993 | Nowak | 384/322 |
| 5,241,867 | * 9/1993 | Cohen et al. | 137/561 A |
| 5,253,733 | 10/1993 | Miyachi | 184/8 |
| 5,279,497 | 1/1994 | Sjodin | 384/373 |
| 5,290,617 | 3/1994 | Mochizuki et al. | 184/8 |
| 5,316,032 | * 5/1994 | DeCoux | 137/561 A |
| 5,341,841 | * 8/1994 | Schaefer | 137/561 A |

* cited by examiner

Primary Examiner—David A. Bucci
Assistant Examiner—Chong H. Kim
(74) Attorney, Agent, or Firm—Wenderoth, Lind & Ponack, L.L.P.

(57) ABSTRACT

A device for introducing lubricant to a shaft at a portion held by bushings located at a bearing portion of a pulley is disclosed. The shaft is provided with a main fluid passage having a relatively large diameter. A packing member having a rod-shaped configuration is inserted through this main fluid passage. The dimensional difference between an open area of the main fluid passage and a sectional area of the packing member creates in the fluid passage a lubricant feeding hole which is smaller than the open area of the main fluid passage. A tributary fluid passage extending from this main fluid passage to a diametrical outside portion of the main fluid passage is provided with slits on an outer circumferential surface of the shaft such that the slits intersect the lubricant feeding hole at right angles. Wire is then inserted through each slit. The slits are then closed with a packing except for the portion containing wire. Consequently, the dimensional difference between the open area of each slit and the sectional area of the wire serves as a lubricant feeding hole.

8 Claims, 14 Drawing Sheets

MECHANICAL ARRANGEMENT FOR FEEDING FLUID AT A MINUTE FLOW RATE

This application is a Divisional Application of Ser. No. 09/154,893, filed Sep. 17, 1998 now U.S. Pat. No. 6,095,287.

BACKGROUND OF THE INVENTION

1. Field of the Invention

The present invention relates to a mechanical arrangement for feeding fluid at a minute flow rate, which is adaptable to a multiplicity of applications.

2. Description of the Prior Art

In, for example, weaving machines, the shedding operations of the shedding motion means such as cam machines, Dobby machines or the like are transmitted to harness frames through suitable transmission means to generate the vertical movements of these harness frames, whereby the warps are allowed to make the shedding motion means. This achieves the co-weaving of the warps with the wefts. The transmission means, which is applied to the shedding operation of the shedding motion means is divided into the negative type in which a spring means is used to carry out one of the upward vertical movement and the downward vertical movement of the harness frame, and the positive type in which the harness frame is driven for both of the upward and downward vertical movements thereof. (See Official Gazette No. 4-228654 to Open Inspection of Patent Applications.)

In the negative type transmission means, wire is generally used as a transmission member for the shedding operation of the shedding motion means. In order to maintain the tension of this wire, pulleys are employed. The pulleys are arranged to turn reciprocatively within the limits of a predetermined angle.

On the other hand, the positive type transmission means generally employs linking mechanisms as transmission means for the shedding operation of the shedding motion means. Swinging levers incorporated in the linking mechanisms are designed to swing reciprocatively within the range of a predetermined angle.

The pulleys and the swinging levers are both provided with bearing members and shafts which support the bearing members. The bearing members or surfaces of the shafts in contact with the bearing members are arranged to be constantly lubricated.

In a generally known construction in which the bearing members and the like are lubricated, the mating shafts are axially provided with oil holes. Similarly, the shafts have oil outflow grooves diametrically located in positions corresponding to the bearing members engaged with them, thereby allowing the oil holes and the oil outflow grooves to be communicatively connected to each other.

On the other hand, it is also known that the bearing members incorporated in the pulleys and the swinging levers are separately provided with oil holes. (See the Official Gazette mentioned in the foregoing.)

In the lubricating construction described in the foregoing, in which the shafts are axially provided with oil holes, it is difficult from the viewpoint of machining techniques to make small diameter oil holes. This difficulty is increased as the axial length of the shafts is increased.

Therefore, the oil holes in the axial directions must inevitably be increased in diameter. However, an increase in the diameter of the axial oil holes makes it difficult to allow lubricant to flow to the oil outflow grooves having smaller diameters, thereby causing frequent oil shortages in the shafts. This results in the problems of heating and singeing. Therefore, in order to prevent such problems, lubricant is required to be fed under a high pressure from the oil holes to the oil outflow grooves, thereby bringing about an oil feeding system having a much larger capacity.

On the other hand, when the bearing members are separately arranged to be provided with oil holes, these oil holes are required to be periodically replenished with lubricant. Replenishment of lubricant necessitates the operational stoppage of, for example, weaving machines each time it is performed. This causes a drop in the operating efficiency of the machines as well as an increase in the working trouble of a machine operator.

SUMMARY OF THE INVENTION

In view of the foregoing disadvantages or problems of the conventional construction for feeding oil to the bearing members and the like, it is an object of the present invention to provide a mechanical arrangement for feeding fluid at a minute flow rate. It is also an object to provide a device which can meet the requirements of an infallible, quantitatively constant and continuous feed of lubricant or other fluid with no regard to a small flow rate thereof per unit time, and also which can prevent any concomitant incurrence of the foregoing disadvantage of a drop in the operating efficiency of the machines as well as an increase in the working trouble of a machine operator.

In the present invention, in order to achieve the foregoing object thereof, the following technical provision is made.

That is to say, in a mechanical arrangement for feeding fluid at a minute flow rate, the principal portion of the arrangement has a shaft-shaped configuration and is axially formed with holes which are relatively easily produced by simple machining. In addition, fluid guide means having a rod-shaped configuration are inserted through the fluid feeding holes throughout the entire length of the holes. The resulting dimensional difference between the opening areas of the fluid feeding holes and the sectional areas of the fluid guide means creates clearances which serve as flowing passages for lubricant or other fluid which flows through the fluid feeding holes.

Such a mechanical arrangement for feeding fluid at a minute flow rate facilitates the formation of the fluid feeding holes, and at the same time, ensures that clearances of minute opening area are created between the fluid feeding holes and the fluid guiding means. Moreover, the mechanical arrangement according to the present invention allows the insertion of the fluid guide means to enhance the fluid feeding pressure through the fluid feeding holes made in the shaft. The arrangement also accelerates the linear advancing movement or flow of the fluid from one end of the shaft to the other.

Such an arrangement in which the clearances between the inner circumferential surfaces of the fluid feeding holes and the outer circumferential surfaces of the fluid guide means are used as the fluid passages is the most effective and advantageous use of the application of the present invention if the principal portion thereof is a shaft, and the shaft is axially formed with a main fluid passage.

In this case, the main fluid passage is required to be provided with a tributary fluid passage formed diametrically outwardly of the principal portion such that the main fluid passage and the tributary fluid passage are communicatively connected to each other. This tributary fluid passage is then furnished with the combined construction of the fluid feeding holes and the fluid guide means.

That is to say, a first fluid feeding hole axially formed in the principal portion is provided with notches having a slit-shaped configuration such that they axially intersect the principal portion at right angles. The notches are produced by a simple machining operation. Therefore, the width of the notches is created by the simple machining operation so that they suffice for embodying the present invention. This product results in easily made notches.

The notches are formed with a portion communicatively connected to the first fluid feeding hole. Also, the notches have pad members having a plate-shaped configuration inserted therein to cover portions unnecessary for the formation of the fluid passage. Thus, a second fluid feeding hole is formed in the notches such that it passes across the communicatively connected portion to the first fluid feeding hole, and extends outside. Moreover, the second fluid feeding hole thus obtained has a second fluid guide means inserted therethrough.

In order to apply such an arrangement, the second fluid guide means is preferably provided with an arched portion which can be inserted into the first fluid feeding hole from the second fluid feeding hole. That is to say, if the first fluid guide means which is inserted into the first fluid feeding hole is formed of a first rod member and a second rod member, the second rod member is successively inserted through the arched portions of the second fluid guide. It is then possible to fix the second fluid guide means to first fluid guide means.

In the mechanical arrangement for feeding fluid at a minute flow rate according to the present invention, the shapes, dimensions and material of the principal portions and the fluid guide means are not limited to those described or shown for the preferred embodiments of the present invention which are described hereinafter. Moreover, in several preferred embodiments of the present invention, the mechanical arrangement according to the present invention uses lubricant as working fluid, and is applied to the weaving machines, fluid diffusing systems, the bed portions of carriages for lathes or other machine tools, needle bearings and the like. However, the working fluid and the applications of the mechanical arrangement according to the present invention are not limited to those described with respect to the preferred embodiments of the present invention.

Also, for example, if the principal portion of the mechanical arrangement according to the present invention is constructed such that a disposition plate member is overlaid on a framing member, and the disposition plate is formed with a plurality of fluid feeding holes having a notch-shaped configuration on the outer circumferential portion thereof, the same basic operation and effect of the present invention as described in the foregoing can be obtained.

In this case, fluid guide means are inserted through the respective fluid feeding holes, and the fluid guide means are connected to one another to thereby allow the formation of a guide integrating body member.

With such an arrangement, the clearances between the fluid feeding holes and the fluid guide means are disposed along the direction of the surface of the disposition plate. This allows diffusible outflow and diffusible jetting of the fluid in a showering configuration. Therefore, the mechanical arrangement according to the present invention can extend the uses thereof to a multiplicity of applying fields or phases.

BRIEF DESCRIPTION OF THE DRAWINGS

The present invention will now be described with reference to the accompanying drawings, in which:

FIG. 13(*b*) is a side view of the disposal plate depicted in FIG. 13(*a*);

FIG. 14(*b*) is a side view of the guide joining body of FIG. 14(*a*);

DETAILED DESCRIPTION OF THE PREFERRED EMBODIMENTS

The first preferred embodiment of the present invention will be described with reference to FIGS. 1–9.

FIGS. 1 to 9 show a mechanical arrangement for feeding fluid at a minute flow rate according to a first preferred embodiment of the present invention. The arrangement is shown in connection with the bearing portion of a pulley 2 which happens to be one of the negative type transmission means of the shedding motion means used in a weaving machine (not shown).

In this mechanical arrangement, a shaft 3 is inserted through the pulley 2 so as to be freely rotatable with respect to the pulley 2. Shaft 3 is formed as a principal portion (hereinafter shaft) of the mechanical arrangement and also constitutes the core thereof. Lubricant such as grease or another similar fluid is supplied along an axially extending main fluid passage 4 which is provided internally of the shaft 3. The lubricant is fed to a bearing portion of the shaft through a diametrically extending tributary fluid passage 5 or tributary fluid hole which is ramified or branches from the main fluid passage 4.

Figure 3:
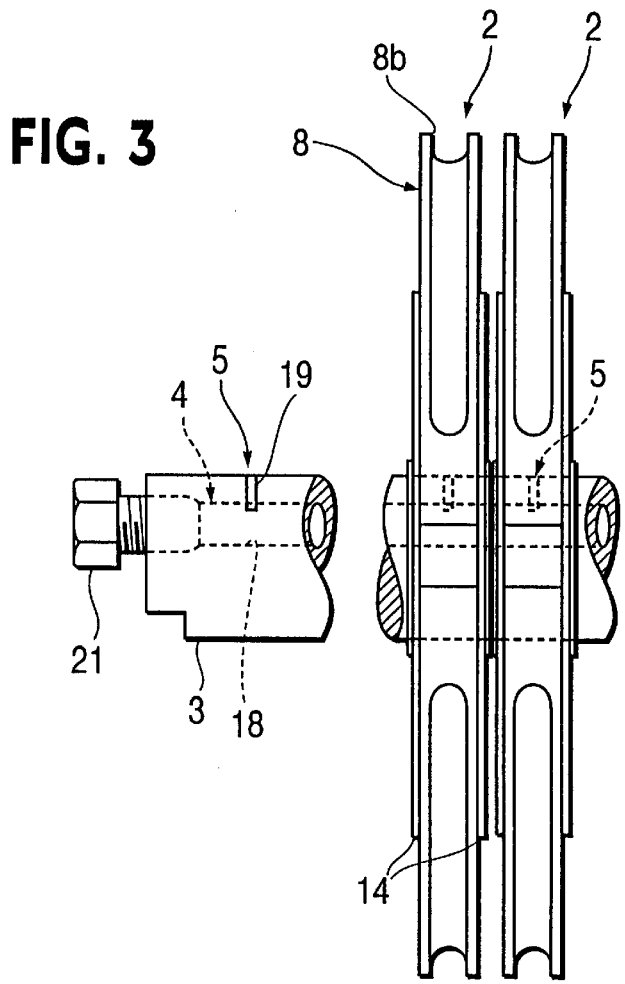
FIG. 3 is a side elevational view taken along the line 3—3 of FIG. 1.

As shown in FIG. 3, two pulleys 2 are used. That is to say, a plurality of pulleys 2 are consecutively attached to the shaft 3 such that the shaft 3 is inserted through their central portions. The pulleys are respectively arranged to be wound with wire 6.

Figure 1:
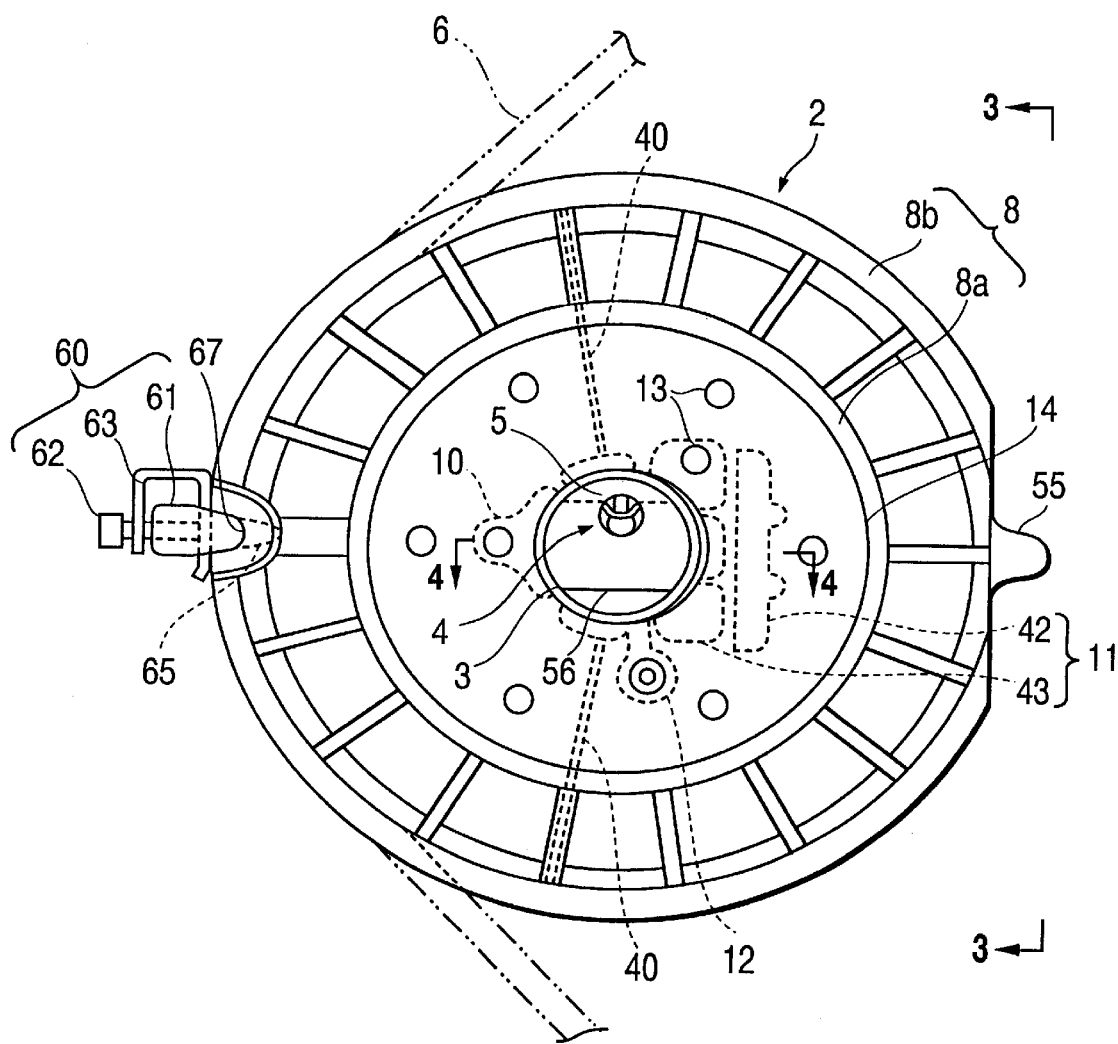
FIG. 1 is an elevational view of a mechanical arrangement for feeding fluid at a minute flow rate, according to a first preferred embodiment of the present invention.
Figure 2:
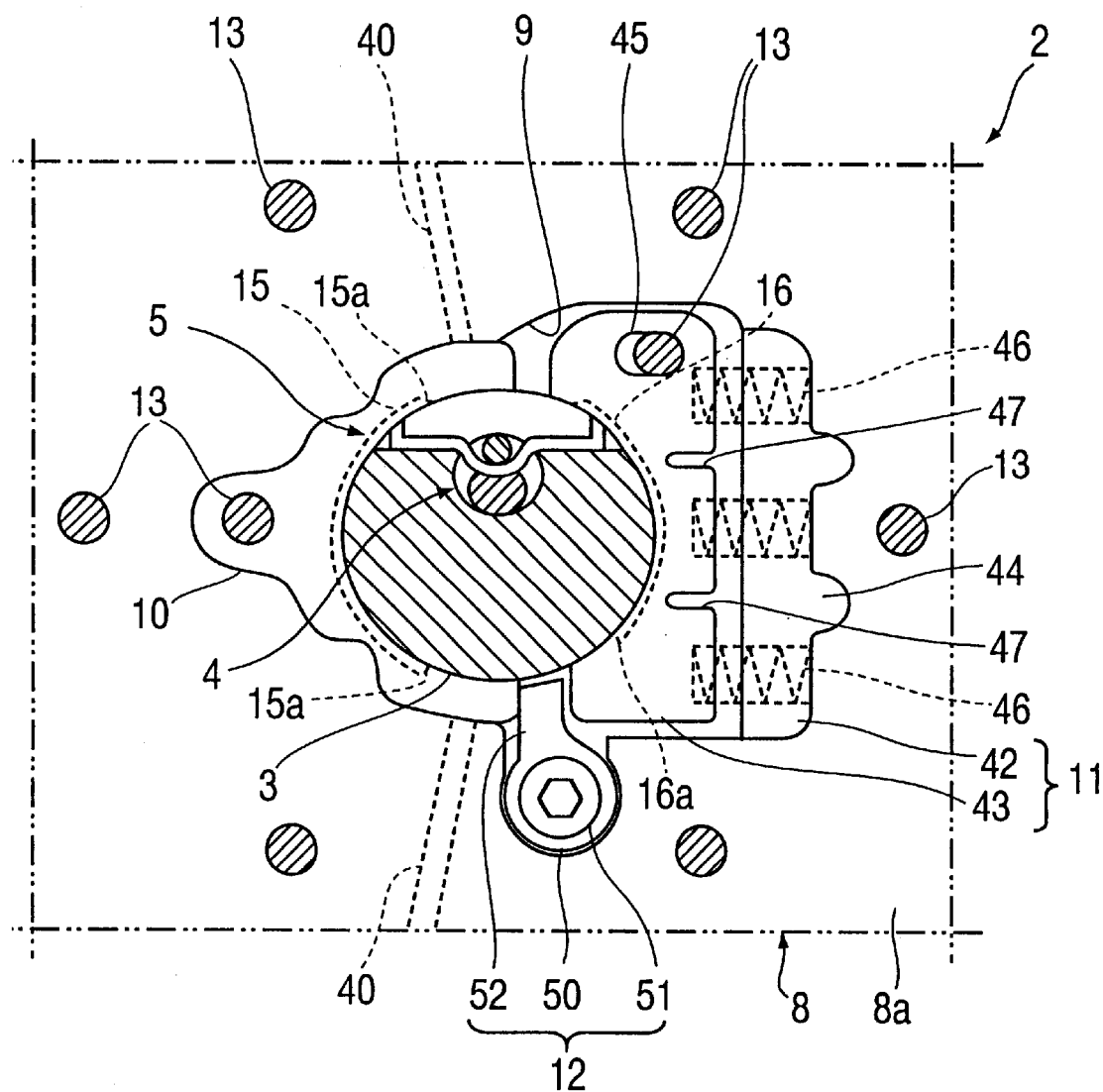
FIG. 2 is an enlarged front sectional view of a principal portion of the mechanical arrangement for feeding fluid at a minute flow rate, as shown in FIG. 1.
Figure 4:
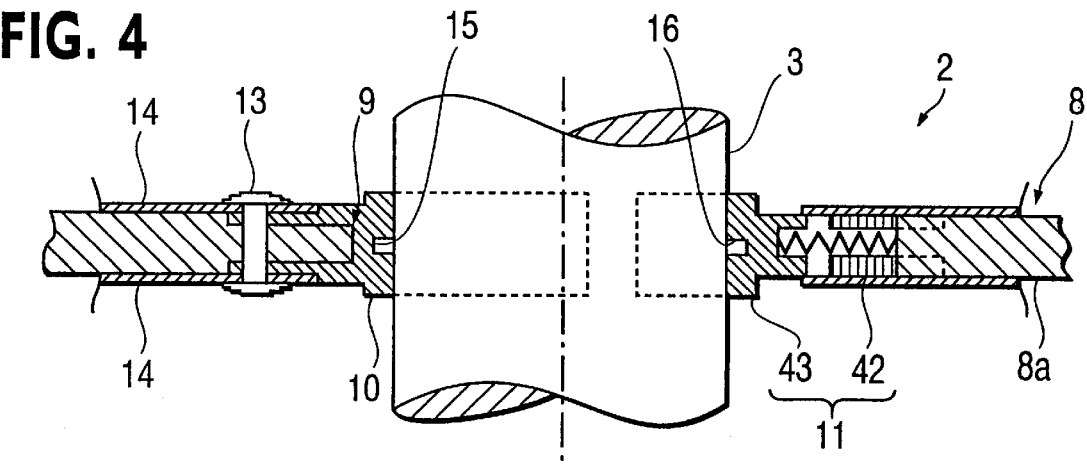
FIG. 4 is an enlarged sectional view along the line 4—4 of FIG. 1.

As shown in FIGS. 1, 2 and 4, each pulley 2 is provided with a pulley body (which can be generically referred to as a machine element) 8 into which a hub 8a and a rim 8b are integrally formed from resin. A fixed bushing 10, a movable bushing 11 and a disengaging means 12 are all internal elements received in a containing recessed portion 9 formed in a middle portion of the hub. Hub covering plates 14 are attached to both sides of the hub of the pulley body 8 by means of rivets, bolts or other fastening means 13 to secure the internal elements inside the pulley body.

The fixed bushing 10 and the movable bushing 11 are formed with oil grooves 15 and 16 on their contact surfaces which face the outer circumferential surface of the shaft 3 such that the oil grooves 15 and 16 are communicatively connected to the tributary fluid passage 5. The pulley 2 is hereinafter described with respect to the other particulars of its construction.

Figure 5:
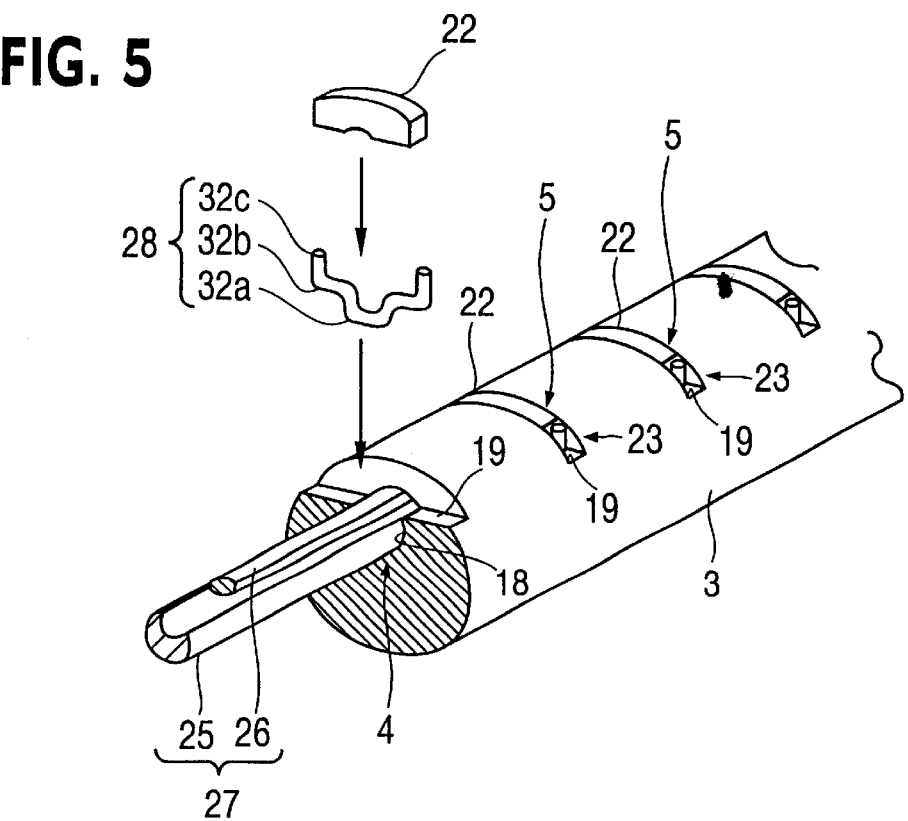
FIG. 5 is an exploded perspective view of the principal portion of the mechanical arrangement of FIG. 1 which shows the first preferred embodiment of the present invention.
Figure 6:
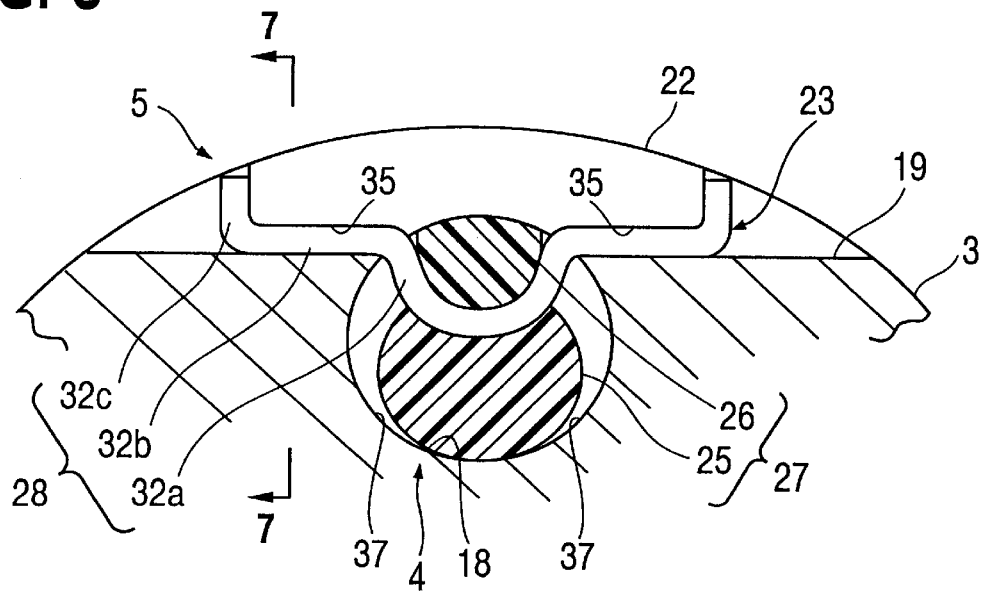
FIG. 6 is a further enlarged front sectional view of the principal portion of the mechanical arrangement as shown in FIG. 2.
Figure 7:
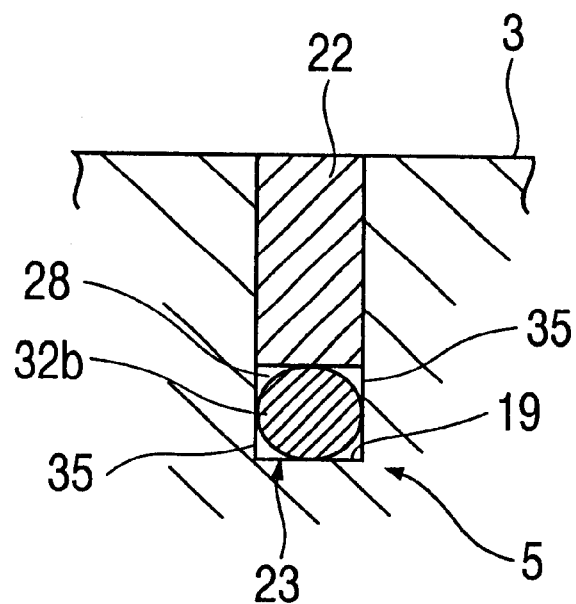
FIG. 7 is an enlarged sectional view taken along the line 7—7 of FIG. 6.

As shown in FIGS. 5 to 7, the shaft 3 is provided with a first fluid feeding hole 18 extending axially through shaft 3 at an eccentric or off-centered position. The shaft is formed with notches 19 in slit-shaped configurations on an outer surface portion of the shaft on the same eccentric side as the first fluid feeding hole 18. The notches 19 are located such that the notches 19 intersect the outer surface of the shaft at right angles and are communicatively connected to a part of the first fluid feeding hole 18.

The first fluid feeding hole 18 extends through the shaft through the entire length of the shaft, and is fitted with a nipple (not shown) on at least one end of the shaft, and if necessary, with a blanking stem 21 (FIG. 3) on the other end of the shaft. The ends of the shaft are otherwise open.

The first fluid feeding hole 18 has an inside diameter of approximately 8.2 mm, and can easily be machined.

Pad members 22 are inserted into a portion of the notches 19 to a depth which forms a portion communicatively connected with the first fluid feeding hole 18. Thus the pads allow the notches to be closed while also leaving a space formed at a certain depth. Therefore, the notches 19 and the pad members 22 form a second fluid feeding hole 23 having a square-shaped configuration or cross section which axially intersects and extends across the shaft 3 adjacent to an outer circumferential surface of the shaft.

The pad members 22 are made from rubber, plastic or other similar elastic or elastomeric material and are therefore capable of being force-fitted into the notches 19 or of being bonded to inside surfaces of the notches through the use of adhesives. Alternatively, the pad members may be made of a metallic material having similar properties as the shaft 3, and may be welded to the notches 19 after being inserted into them. In this case, there is an advantage in which a decrease in the strength of the shaft resulting from the formation of the notches 19 can be prevented.

The notches 19 which form the second fluid feeding holes 23 are approximately 1.5 mm in width with a plus tolerance so that they can easily be machined.

The first fluid feeding hole 18 has a first fluid guide means 27 inserted therethrough which comprises a first rod member 25 having a diameter smaller than that of the first fluid feeding hole 18 and a second rod member 26 having a diameter smaller than that of the first rod member 25. The second fluid feeding hole 23 has a second fluid guide means 28 fitted thereinto.

The second fluid guide means 28 inserted through the second fluid feeding hole 23 is formed by bending, to a predetermined configuration, wire of a circular sectional configuration which has an outside diameter of approximately 1.5 mm with a minus tolerance.

The second fluid guide means 28 is bent such that a longitudinally middle portion thereof is formed with an arched portion 32a which juts into the first fluid feeding hole 18 from the second fluid feeding hole 23 through the communicatively connected portion of each notch 19. The arched portion 32a is provided with main stem portions 32b which extend therefrom to both sides thereof. End portions of both main stem portions 32b are provided with an end portion 32c which is bent in a direction opposite the direction of the arched portion 32a so as to embrace and position the pad member 22 within the second fluid feeding hole 23.

With such an arrangement, as illustrated in FIG. 7, the second fluid feeding hole 23 is formed with four clearances 35 each located between the inside surfaces of the four internal corner portions of the second fluid feeding hole 23 and the outer circumferential surface of the main stem portion 32b of the second fluid guide means 28.

Therefore, it will be understood that the tributary fluid passage 5 described in the foregoing also includes fluid passages formed by the areas of these four clearances 35.

As is apparent from FIG. 6, outside both bent end portions 32c of the second fluid guide means 28, there remains an empty space in the notch 19 or a region or space which is filled by the pad member 22. This region is identified as a fluid passage in the shaft. However, the region is not critical to the passage of fluid because the fluid which flows through the clearances 35 is for the most part guided from the main stem portions 32b of the second fluid guide means 28 to both end portions 32c thereof while remaining in proximity with the wall surfaces of the main stem portions 32b and both end portions 32c.

The first fluid guide means 27 inserted into the first fluid feeding hole 18 is provided with the first rod member 25 and the second rod member 26 as described in the foregoing. The second rod member 26 is inserted into the arched portion 32a of the second fluid guide means 28 which juts into the first fluid feeding hole 18. The first rod member 25 is inserted through the first fluid feeding hole 18 together with the second rod member 26.

It is suitable or advantageous for the embodiments of the present invention that the first rod member 25 and the second rod member 26 are made from resin of a soft physical property, rubber or other similar material, and it is optimum that both rod members are made from a material which is generally used to make oil seals.

With such an arrangement, as depicted in FIG. 6, the first fluid feeding hole 18 is formed with a clearance 37 between the inner circumferential surface of the first fluid feeding hole 18 and the outer circumferential surface of the first rod member 25. Therefore, this clearance 37 forms the area of the fluid passage in the first fluid feeding hole 18, and corresponds to the main fluid passage 4 already described in the foregoing.

In the shaft 3, the communicatively connected portions of the first fluid feeding hole 18 and the second fluid feeding holes 23 are formed axially of the shaft 3 in alignment as a whole. Therefore, the arched portions 32a of the second fluid guide means 28 are arranged in alignment or in other words they are aligned so that the arched portions all fall on a line. For this reason, the second rod member 26 is also positioned so as to extend linearly by means of the arched portions 32a of the second fluid guide means 28. Moreover, since the second rod member 26 is linearly arranged, the first rod member 25 is also linearly disposed. As a result, the clearances 37 are formed in alignment, and this results in an advantage of a decrease in the flowing resistance of the entire fluid passage which resists the flow of the fluid flowing therethrough.

In practice, in order to form the main fluid passage 4 and the tributary fluid passage 5, the second fluid guide means 28 are inserted into all the notches 19 of the shaft 3 in a predetermined direction. Next, the second rod member 26 of the first fluid guide member 27 is inserted through the first fluid feeding hole 18 from one end thereof to allow the second rod member 26 to be passed in sequence through the arched portions 32 of the second fluid guide means 28.

This procedure for the formation of the main fluid passage 4 and the tributary fluid passage 5 prevents any detachment of the second fluid guide means 28 from the notches 19, and also any detachment of the second rod member 26 from the first fluid feeding hole 26. Moreover, the elasticity of the material from which the second rod member 26 is made allows this rod member and the second fluid guide 28 to be mutually pressed into abutment with each other. This additionally serves to precisely position the second rod member 26 and the second fluid guide member 28 in a predetermined place.

Subsequently, the first rod member 25 of the first fluid guide member 27 is inserted into the other space, or rather the space not filled or occupied by the second rod member 26 within the first fluid feeding hole 18. Consequently, the second rod member 26 is supported by the first rod member 25, thereby completely removing any play of the second fluid guide members 28 within and relative to the notches 19.

In the last stage of the formation of the main fluid passage 4 and the tributary fluid passages 5, the pad members 22 are inserted into all the notches 19 and are fixed to the notches by the use of a suitable means. The pad members 22 are positioned by means of the bent end portions 32c of the second fluid guide means 28, as described in the foregoing.

In the mechanical arrangement for feeding fluid at a minute flow rate, thus made according to the first preferred embodiment of the present invention, if lubricant is fed from one end of the first fluid feeding hole 18 to which a nipple (not shown) is attached, this lubricant axially flows through the main fluid passage 4 along the first fluid guide member 27 (the first rod member 25 and the second rod member 26).

Moreover, if the lubricant reaches each portion of the shaft which is mounted with the pulley 2, the lubricant ramifies into the tributary fluid passage 5 along the arched portion 32a of the second fluid guide means 28 which juts into the first fluid feeding hole 18 through the communicatively connected portion of the first fluid feeding hole 18 and the second fluid feeding hole 23.

Moreover, through the tributary fluid passage 5, the lubricant is guided to the outer circumferential surface of the shaft 3 along both bent end portions 32c of the second fluid guide member 28 from the main stem portion 32b thereof. The lubricant is then fed to the oil groove 15 of the fixed bushing 10 and the oil groove 16 of the movable bushing 11, which bushings are both provided in the pulley 2, as seen in FIGS. 1 and 4.

The oil grooves 15 and 16 are blocked at their circumferential ends thus forming flow stopping portions 15a and 16a. The oil grooves 15, 16 and the flow stopping portions 15a, 16a cooperate with each other to form oil reservoirs which prevent the discharge of the lubricant outside the bushings. Particularly in devices which are designed to have swinging movement through a predetermined angle, such as the pulleys of the weaving machines, it is desirable to form such oil reservoirs in their bearing portions (bushings). That is to say, the oil reservoirs allow even a small amount of lubricant to achieve sufficient lubrication of the bearing portions and the mating shafts over a long period of time. This results in long-term upkeep of the function of the bearing portions (bushings) which are provided with the oil reservoirs.

Internal elements provided in the containing recessed portion 9 of the pulley 2 will be briefly described with reference to FIG. 1.

The fixed bushing 10 is made from Nylon or other similar resin, and is shaped such as to be ramified or branched into two portions at the place of the fastening means 13.

Each ramified or branched portion of the fixed bushing 10 is arranged to have back pressure exerted thereupon by backup screws 40 diametrically buried in the pulley body 8 from the outer circumferential portion thereof. Therefore, if the fixed bushing 10 must have its contact pressure with the shaft 3 adjusted as a result of, for example, wear or abrasion the backup screws 40 are used to adjust the contact pressure of the bushing 10 with the shaft 3.

On the other hand, the movable bushing 11 comprises in combination a bushing body 43 and a spring case 42 which is made from Nylon or other similar resin. The spring case 42 is positioned in the containing recessed portion 9 by using a plurality of positioning protrusions 44. The bushing body 43 has the fastening means 13 inserted through an elongated hole formed therein so as to approach one end thereof thereby allowing the bushing body to be moved towards or away from the shaft 3.

The bushing body 43 is additionally forced against the shaft 3 by means of three springs held in the spring case 42.

Also, the bushing body 43 is provided with notches 47 between the positions where the bushing body 43 contacts the springs 46, and this facilitates the occurrence of deflection or elasticity in the bushing body 43 itself.

The provision of this kind of movable bushing 11 in the shaft 3 furnishes the bushing body 43 and the shaft 3 with pliability, flexibility or other similar physical property in the sense that the bushing body is always positioned in a predetermined suitable degree of abutment with the shaft regardless of wear or abrasion of the bushing body 43. From this, it follows that the pulley 2 has a backlash absorbing system formed in the bearing portion thereof.

Also, the bushing body 43 itself is deflectable or resilient by reason of the notches 47 made therein, and this increases the pliability or flexibility resulting from the contact between the bushing body 43 and the shaft 3. As a result, the backlash absorbing operation and effect of the pulley 2 between the shaft and the mating bushings is enhanced.

A disengaging means 12 is provided with a revolving portion 50 which is rotatably held between the hub covering plates 14 (FIGS. 1 and 4) a tool engaging portion 51 which can protrude outside the hub covering plate 14 from the revolving portion 50, and a disengaging armed member 52 which extends diametrically and outwardly of the revolving portion 50.

This disengaging means 12 is provided such that the disengaging armed member 52 is inserted between the bushing body 43 of the movable bushing 11 and the fixed bushing 10 which are in proximity with each other adjacent to an end portion of the hub on the opposite side of the elongated hole 45. With such an arrangement, the disengaging armed member 52 is designed to be kept in contact with the fixed bushing 10 by means of a spring means (not shown).

The tool engaging portion 51 is arranged to have a tool such as hexagon-head wrench inserted thereinto. Therefore, if a tool is attached to this tool engaging portion 51, and is operated against the tension of the spring means (not shown but described in the preceding), the bushing body 43 of the movable bushing 11 can be disengaged from the shaft by using the disengaging armed member 52.

This disengaging means 12 must be operated when the connecting angle of the shaft 3 and the pulley is adjusted, and particularly when the oil grooves 15, 16 of the bushings 10, 11 and those (not shown) of the shaft 3 are brought into alignment with each other.

Figure 8:
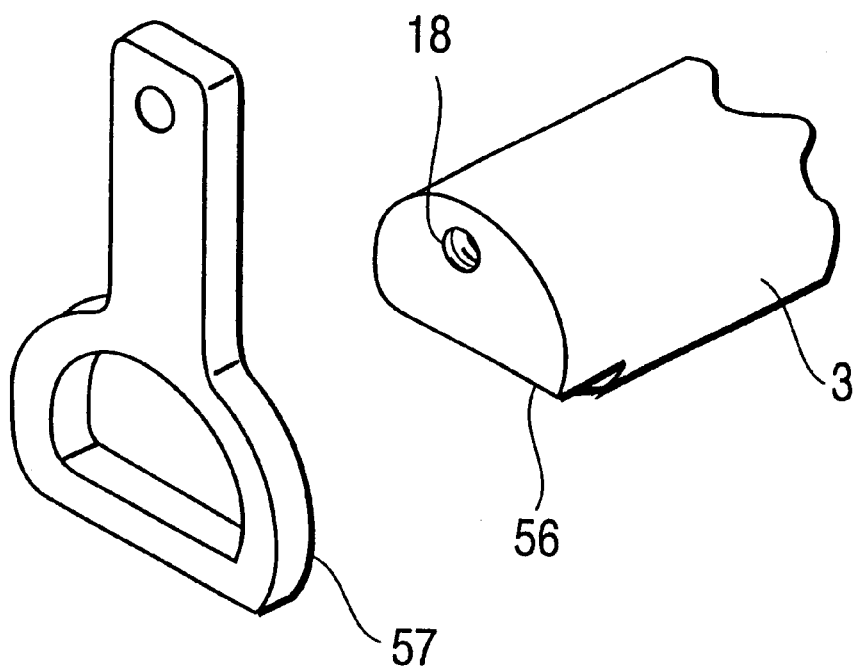
FIG. 8 is a perspective view of a part (an end portion of a shaft) of the mechanical arrangement as shown in FIG. 1 according to the first preferred embodiment of the present invention.

In the first preferred embodiment of the present invention, in order to adjust the mounting angle of the pulley 2 to the shaft 3, a projection 55 serving as a guide for the adjustment of the mounting angle is provided at a portion of the pulley body 8 which is not wound with the wire 6, as shown in FIG. 2. In addition as depicted in FIG. 8, the shaft 3 is provided with a tool engaging notch 56 at one end portion thereof. Furthermore, a jig 57 formed in a spanner-shaped configuration which can be engaged with this notch 56 is provided as an accessory component part.

Figure 9:
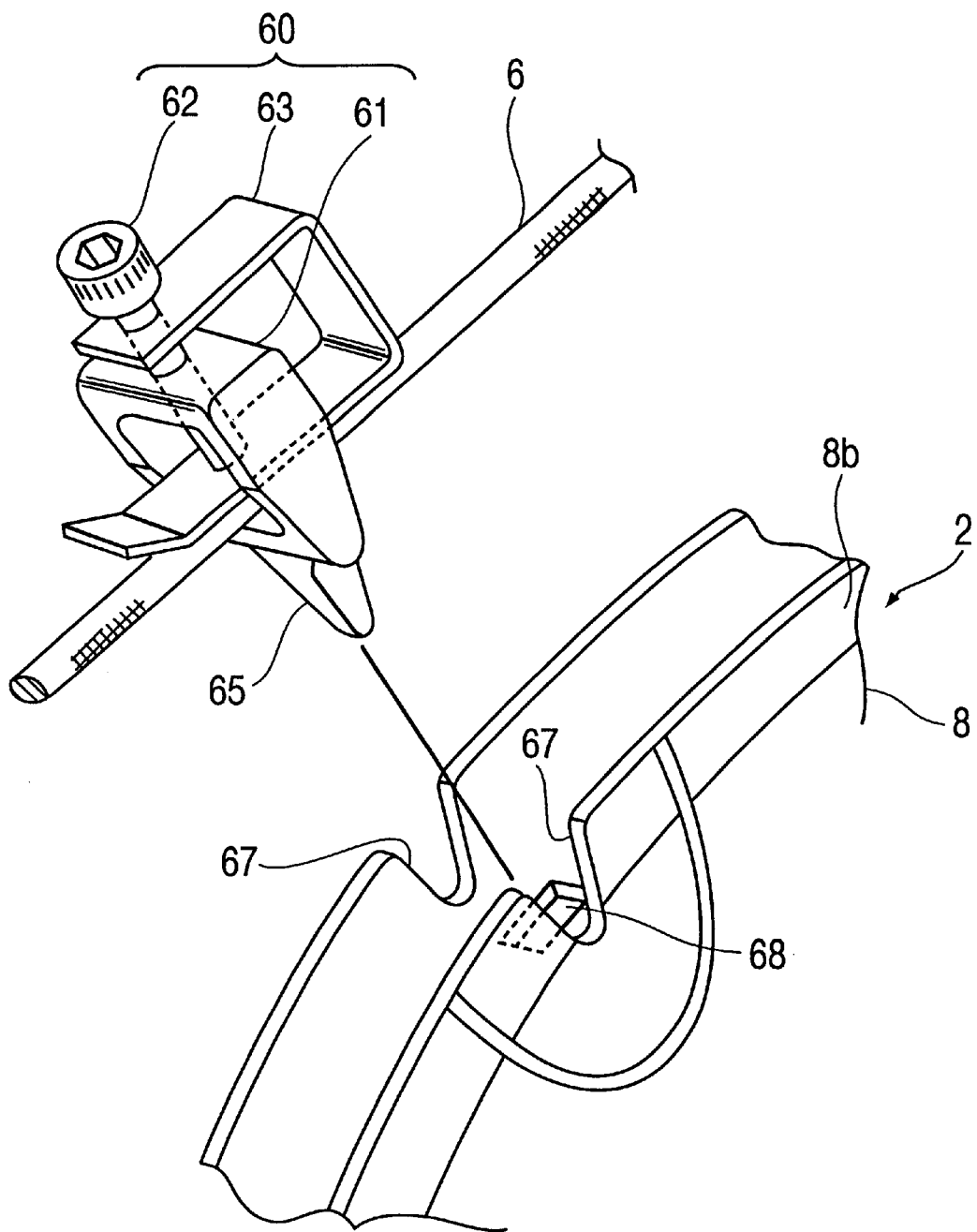
FIG. 9 is a perspective view of a part (a wire holder means attached to the outer circumferential portion of a pulley) of the mechanical arrangement as shown in FIG. 1 according to the first preferred embodiment of the present invention.

Moreover, in the first preferred embodiment of the present invention, as illustrated in FIGS. 1 and 9, the pulley is provided with a wire holding means 60 at a portion thereof at which the wire 6 is coiled around the pulley 2, to thereby maintain the relative position of the pulley 2 with respect to the wire 6.

As is best illustrated in FIG. 9, this wire holding means 60 comprises a wire passing means 61 having a frame-shaped configuration, a bolt means 62 threadably engaged with the wire passing means 61, and a clearance adjusting means 63 which regulates the clearance adjustably formed within the wire passing means 61 by using the bolt means 62 to engage the wire 6. The wire passing means 61 is provided with a keel member 65 extending towards a center and bottom of a rim portion 8b of the pulley body 8 such that the keel member is arranged to be brought into abutment with the rim portion 8b of the pulley body 8.

On the other hand, the pulley body 8 is formed with a positioning notch 67 in the rim 8b thereof. This positioning notch 67 can be engaged with the bottom portion of the wire passing means 61. Further, the pulley body has a keel receiving hole 68 which allows the keel member 65 to be inserted therethrough.

With such an arrangement, once the positioning of the wire 6 relative to the wire holding means 60 is adjusted, the relative position of the wire holding means 60 to the pulley can be unchangeably maintained. This allows the wire to be invariably held with respect to the pulley 2.

In the negative type weaving machines, the wire holding means 60 must be provided. The reason for this need is that it is necessary to prevent any abrasion of the wire 6 which may be caused by possible reverse rotation of the pulley 2.

That is to say, in this first preferred embodiment of the present invention, the pulley 2 is provided with the fixed bushing 10 and the movable bushing 11 in the bearing portion thereof for the shaft 3 instead of a roller or ball bearing which is generally used for a shaft receiving portion in machinery.

In the pulley 2 to which the first preferred embodiment of the present invention is applied, the employment of the fixed bushing and the movable bushing with the pulley 2 reduces wear or abrasion of these bushings and therefore that of the mating shaft as well by using the mechanical arrangement for feeding fluid at a minute flow rate. On the other hand, rotational resistance of the pulley 2 against the shaft 3 will not be diminished as much with a ball or roller bearing although the application of the roller or ball bearing to the pulley easily causes a backlash between the pulley and the mating shaft, because the bearing rollers or balls can easily be worn out or abraded.

Therefore, in the transmission means of the shedding motion means for the weaving machines, or other similar devices in which there is the risk that a reverse rotational force instantaneously occurs on the shaft to make an impact thereupon, the rotational resistance of the pulley 2 against the shaft 3 occasionally causes the pulley 2 to undergo simultaneous sudden reverse rotation with the reverse rotation of the shaft 3. This threatens instantaneous yet excessive abrasion of the wire 6, and may cause a decrease in the durability or service life of the wire 6.

However, the application of the wire holding means 60 prevents abrasion of the wire 6, and achieves a suitable amount of slide of the wire 6 with respect to the pulley 2.

The wire holding means 60 is opposed to the projection 55, which serves as a guide for the adjustment of the mounting angle of the pulley 2 to the shaft 3, such that the shaft 3 is interposed between the wire holding means 60 and the projection 55. This allows the pulley 2, or the wire holding means to be easily and infallibly positioned with respect to the wire 6.

Figure 10:
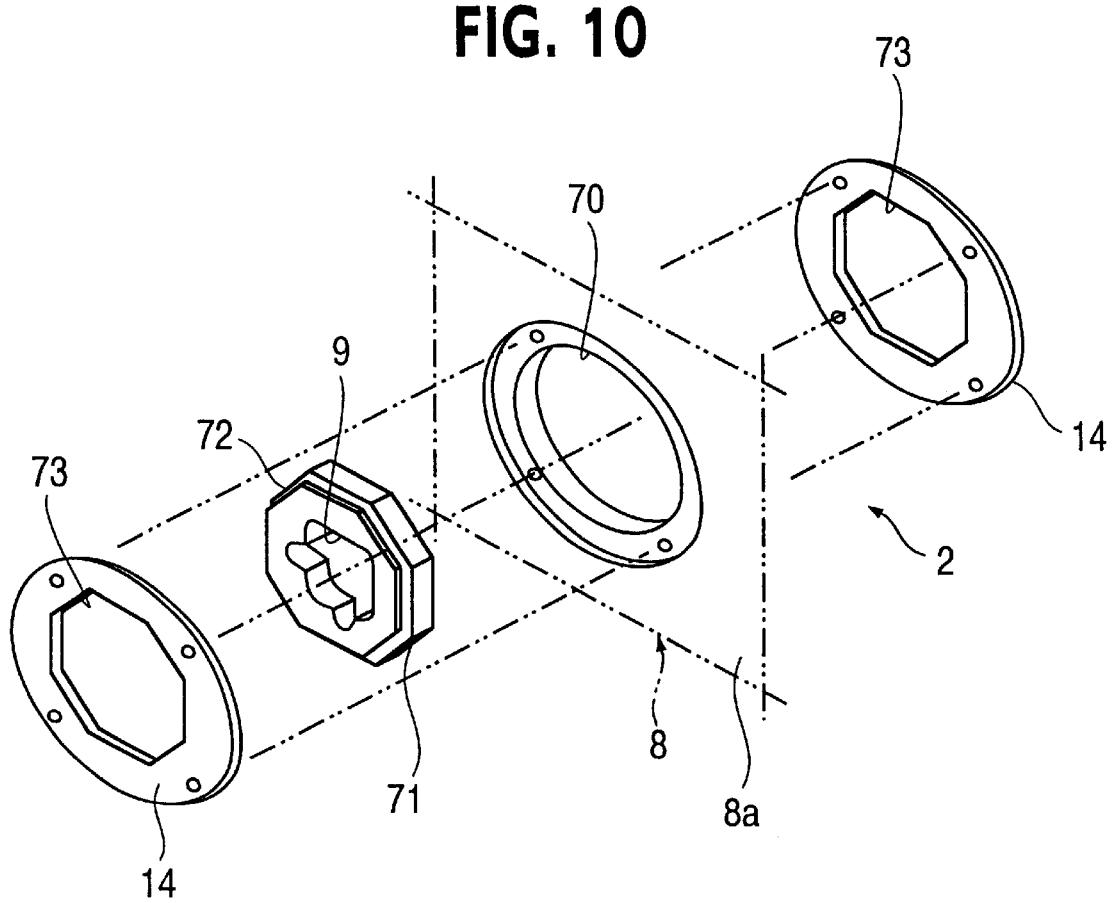
FIG. 10 is an exploded perspective view of a different type hub of the pulley which is applied to the mechanical arrangement according to the first preferred embodiment of the present invention.

As illustrated in FIG. 10, the hub 8a of the pulley body 8 is formed with an opening portion 70 of a large diameter having a regularly octagonal core-like hub member 71 of some thickness inserted thereinto. This hub member 71 is provided with the recessed portion 9.

Also, the core-like hub 71 is formed with a shoulder portion 72 on the outer circumferential portion of each side thereof such that the shoulder portion 72 edges the outer circumferential portion of each side of the hub 71. The hub covering plate 14 attached to each side of the hub of the pulley body 8 is provided with a regularly octagonal positioning aperture 73 which can have the shoulder portion 72 of the core-like hub member fitted thereinto.

With such an arrangement, the relative fitting angle of the hub covering plate 14 and the core-like hub member 71 can therefore be selected from eight kinds of angles, or eight distinct alignments between the two, which accurately divide the circumference of the hub covering plate 14 into eight equal parts. As a result, the mounting angle of the shaft 3 and the core-like hub member 71 is decided in preference or on user preference, while on the other hand, the engaging angle of the pulley body 8 with the core-like hub member 71 is available as eight kinds or in other words, the two may be engaged together in eight distinct portions. This facilitates large alteration or wide range of the angles through which the wire is wound to the pulley body 8.

FIGS. 11 to 14 show a second preferred embodiment of the present invention in which the mechanical arrangement for feeding fluid at a minute flow rate according to the present invention is applied to the head portion of a fluid diffusing system or nozzle means.

In this mechanical arrangement according to the second preferred embodiment of the present invention, a principal portion 110 which forms the nucleus of the mechanical arrangement is provided with a framing member 112 and a disposition plate member 113. The principal portion 110 is combined with a guide integrating body member 116 in which a plurality of fluid guide means 115 are integrally connected to one another. These fluid guide means 115 are arranged to be coupled to an end portion of a fluid feeding pipe 117 or equivalent.

The framing member 112 of the principal portion 110 has a square-shaped frame configuration. An opening portion 119 within the frame of the framing member 112 also has a square-shaped configuration.

Figure 13A:
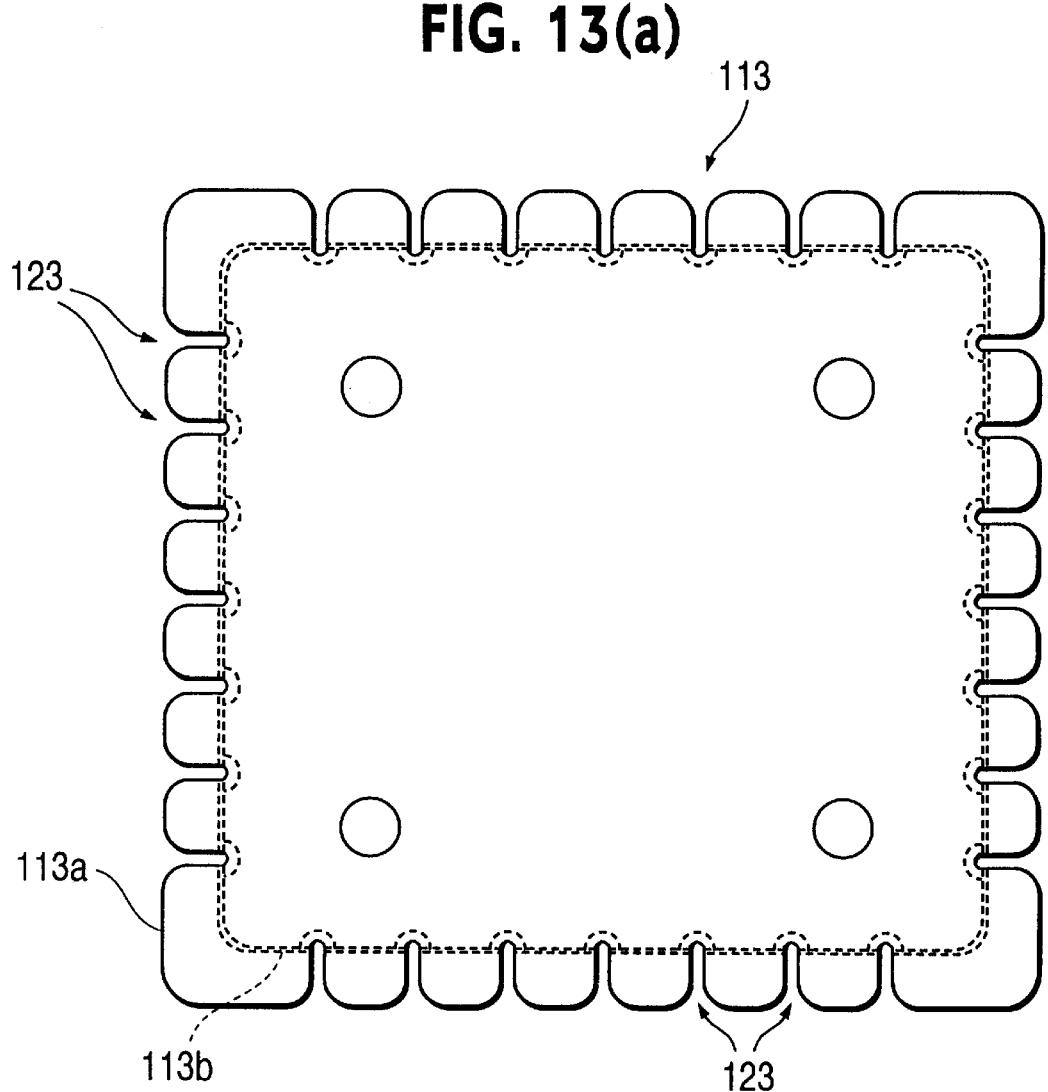
FIG. 13(*a*) is a front view of a disposal plate which is applied to the mechanical arrangement according to the second preferred embodiment of the present invention.
Figure 13B:
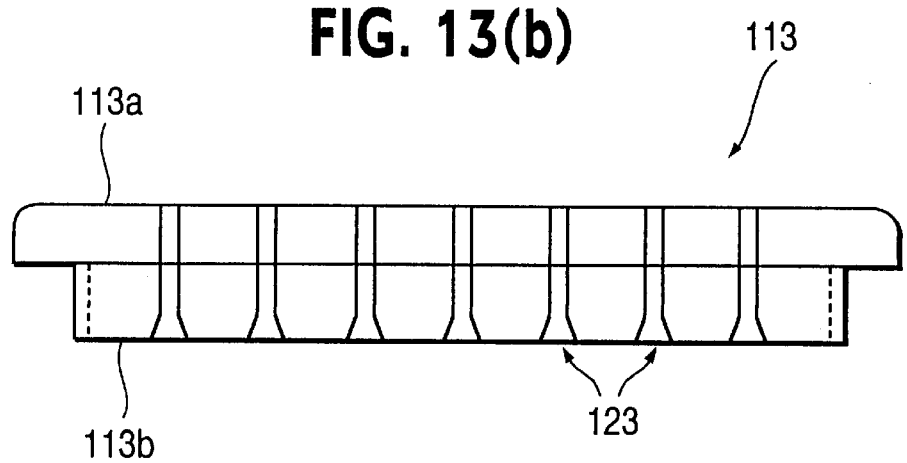
Figure 14A:
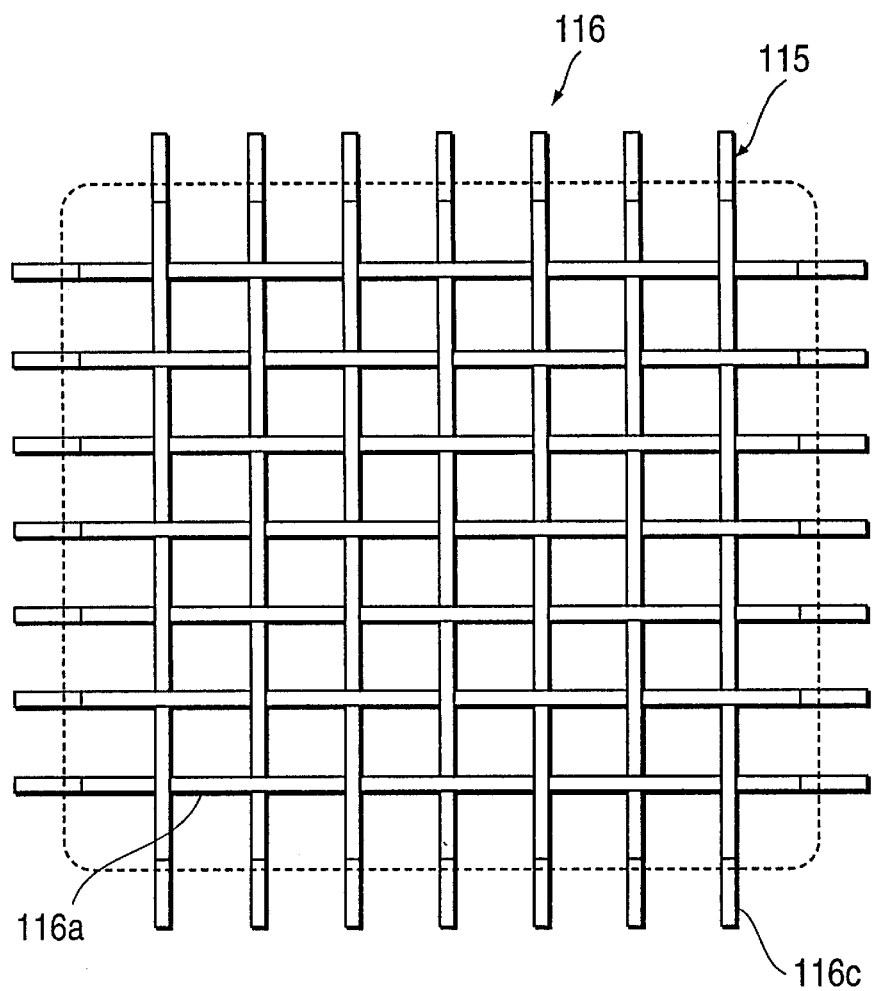
FIG. 14(*a*) is a frontal view of a guide joining body.
Figure 14B:
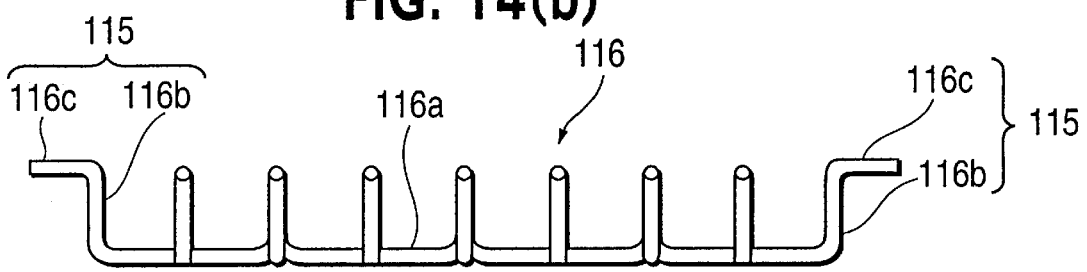

On the other hand, as shown in FIG. 13, the disposition plate member 113 has a planely square-shaped configuration when viewed from the top and sideways T shaped configuration when viewed from the side. Thus, the disposition plate member 113 comprises a large-sized base portion 113a on its front or top side and a small-sized base portion 113b is formed such that it has a plane size and thickness which allow it to be precisely fitted into the opening portion 119 of the framing member 112.

The disposition plate member 113 is formed with slots (notches) 123 which extend therethrough in the direction of the disposition plate member height, and extend from the outer circumferential surface of the large-sized base portion (i.e., shoulder portion) 113a to that of the small-sized base portion 113b. Therefore, if this disposition plate member 113 is overlaid on the framing member 112 so that the small-sized base portion 113b is fitted into the opening portion 119 of the framing member, the outer circumferential surface at the small-sized base portion 113b is brought into contact with the inner circumferential edge portion of the opening portion 119. Furthermore, the respective slots 123 are also inserted into the opening portion 119 of the framing member 112, thereby allowing the large-sized base portion 113a to cover this opening portion 119.

On the other hand, the guide integrating body member 116 is provided with netting forming horizontal portions 116a made of wire having a thickness which allows them to be inserted through the slots 123. The guide integrating body member also includes rising portions 116b formed by bending the wire materials upwardly which are in effect the horizontal portions, and engaging portions 116c outwardly bent at the end portions of the respective outermost rising portions 116b.

The wire netting formed by means of the horizontal portions 116a has substantially the same plane size as the small-sized base portion 113b of the disposition plate member 113. Each mesh of the wire netting is formed having a length of equal to the distance between two slots 123 made in the disposition plate member 113. Also, the rising portions 116b are designed to have a height which is identical to the thickness of the small-sized base portion 113b.

With such an arrangement, if the disposition plate member 113 is inserted into the framing member 112 with the guide integrating body member 116 interposed therebetween the rising portion 116b and the engaging portion 116C of the guide integrating body member 116 are respectively inserted through the slots 123, thereby forming the fluid guide means 115.

As a result, the difference or the area between the opening areas of the slots 123 and the sectional areas of the rising portions 116b of the fluid guide means 115 provide clearances which serve as fluid passages.

In the second preferred embodiment of the present invention, a plurality of fluid passages are formed along the outer circumferential surface of the disposition plate member, as described in the foregoing. Therefore, the outflow or jet of fluid which is fed through fluid diffusing system or nozzle which incorporates therein or is used in conjunction with the mechanical arrangement for feeding fluid at a minute flow rate according to the present invention will flow in the direction of the surface. Consequently, the fluid diffusing system according to the present invention achieves a diffusion of fluid flowing therethrough, in a variety of diffusing states including spraying and showering.

Figure 11:
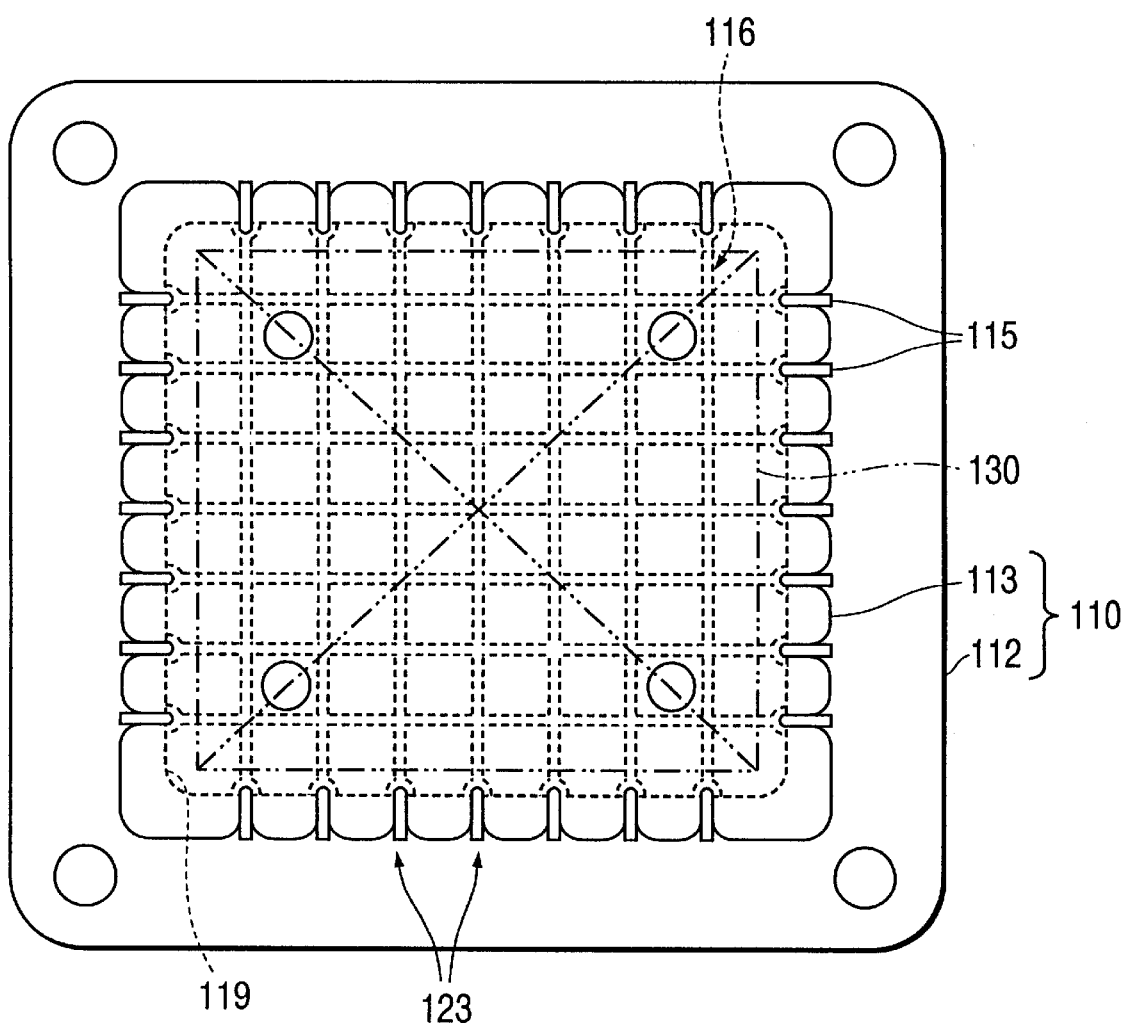
FIG. 11 is a front view showing the mechanical arrangement for feeding fluid at a minute flow rate according to a second preferred embodiment of the present invention.
Figure 12:
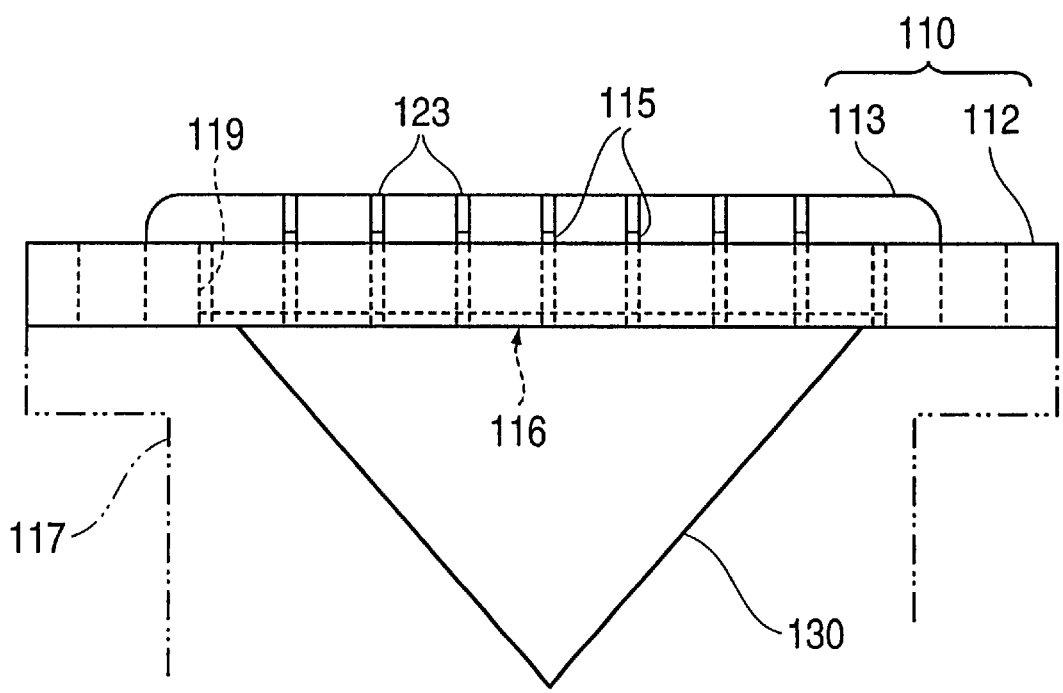
FIG. 12 is a side view of the mechanical arrangement as shown in FIG. 11.

As shown in FIGS. 11 and 12, the framing member 112 may have a guide body 130 having a pyramid-shaped configuration attached to the rear or bottom thereof to allow the guide body to jut into the fluid feeding pipe. In this case, the fluid will be guided to the rising portions 116b of the fluid guide means 115 from the fluid feeding pipe 117 along the guide body 130. This accelerates the flow of the fluid to the fluid diffusing system.

Also, in this second preferred embodiment of the present invention, the principal portion 110 and the guide integrating body member 116 are shown formed in a quadrilateral configuration. However, they may also be shaped in a circular or disk-shaped configuration, along with a circular fluid discharging passage connected to the fluid diffusing system.

Moreover, the guide body 130 may be formed in a cone-shaped configuration instead of a pyramid-shaped configuration. If the fluid discharging passages are disposed in a circular configuration, it is preferable that the guide body 130 to be of a cone-shaped configuration.

The mechanical arrangement for feeding fluid at a minute flow rate according to the present invention is not limited to the foregoing preferred embodiments of the present invention.

For example, if the mechanical arrangement according to the present invention is applied as a fluid feeding means to mechanical devices or machinery, as shown and described in the first preferred embodiment of the present invention, the applicable fluid is not limited to lubricant, and water, oil or gas employed for the use of cooling or washing can also be applied.

If the mechanical arrangement according to the present invention is applied in the form of the second preferred embodiment, it can be used as a fuel jet in an internal combustion engine, and also as a variety of washing apparatuses, water and air showering devices and the like and a wide range of fluid can be applied.

Also, the second preferred embodiment of the present invention can be applied to the suction of fluid as well as to the outflow and jetting of fluid.

As is apparent from the foregoing description, the mechanical arrangement for feeding fluid at a minute flow rate according to the present invention is made having the shaft of a principal component with fluid feeding holes formed therein. In addition, the fluid guiding means are inserted through the fluid feeding holes. Hence, clearances between the opening areas of the fluid feeding holes and the sectional areas of the fluid guiding means serve as fluid passages.

Therefore, the fluid feeding holes are easily formed in the shaft, and moreover, the fluid passages can have their opening areas minimized to achieve a minute flow rate for fluid flowing the through. This is a great advantage of the present invention. That is to say, any devices, machines or systems comprising in combination the shafting and the bearing portion will have a reduced backlash between the shafting and the bearing portions which are engaged together, if the mechanical arrangement according to the present invention is applied to the combined mechanism. That is because the mechanical arrangement of the present invention only allows a minute flow rate of lubricant to the outer circumferential surface of the shafting and the lubricant is held in the fluid feeding holes of the shafting over a longer period of time.

If the principal portion is formed in a shaft-shaped configuration with axially extending clearances for the fluid passages, the principal portion is required to be provided with the diametrically extending tributary fluid passages to guide the fluid from the clearances of the fluid passages to an area outside of the principal portion. In this case, the tributary fluid passage incorporates the combined structure of the fluid feeding hole and the fluid guide means with each other. This can obtain the same advantage of the present invention as described in the foregoing.

If the principal portion of the mechanical arrangement according to the present invention is constructed such that the framing member and the disposition plate member are overlaid on each other, and the disposition plate member is formed with a plurality of fluid feeding holes having a notch-shaped configuration in the outer peripheral portion thereof, these fluid feeding holes form a plurality of clearances relative to the fluid guide means which extend in the direction of surface. This achieves diffusing outflow or jetting of the fluid or in other words, showering.

Figure 15:
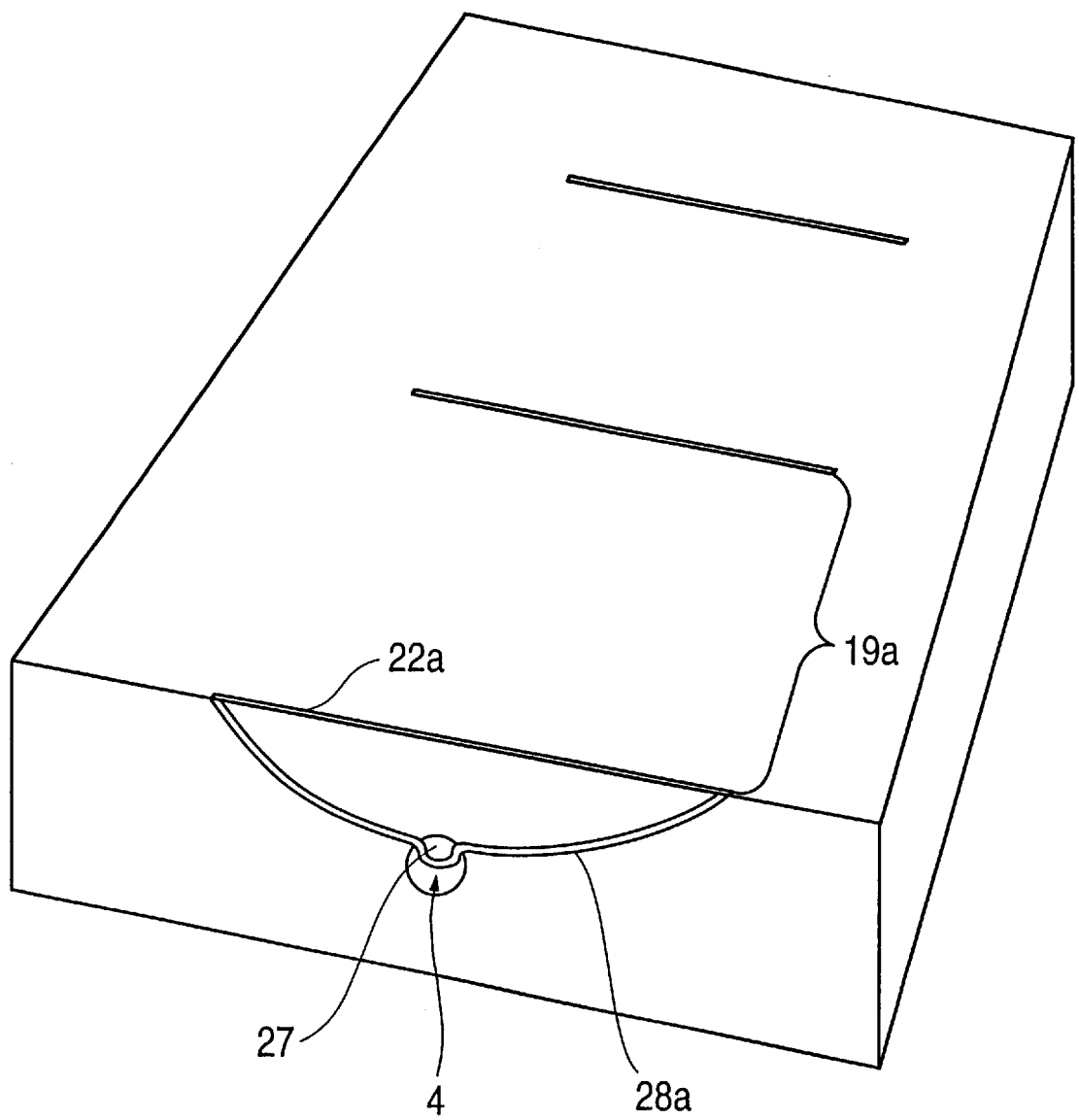
FIG. 15 is a perspective view showing a bed member of, for example, a lathe to which the mechanical arrangement according to a third preferred embodiment of the present invention is applied.

The mechanical arrangement for feeding fluid at a minute flow rate, according to the present invention can be also applied to carriages for lathes or other similar machine tools. FIG. 15 shows a third preferred embodiment of the present invention in which the mechanical arrangement according to the present invention is applied to a bed member of, for example, a lathe. In FIG. 15, a pad member 22a is inserted into a second fluid feeding hole as in the first preferred embodiment of the present invention. The pad member 22a is inserted through the second fluid feeding hole to form a clearance which serves as a fluid passage. The second fluid guide means applied in the first preferred embodiment of the invention is shown at 28a, and extends through the clearance via the first guide means 27 to both sides thereof such that both end portions of the second fluid guide means 28a are flush with the outer surface of the bed member or located slightly below this outer surface of the bed portion.

If both end portions of the second fluid guide means 28a are located slightly below the outer surface of the bed portion, recessed portions are formed on the outer surface of the bed member, and hence respectively serve as oil reservoir means. This is true of the first preferred embodiment of the present invention which is already described in the foregoing.

Figure 16:
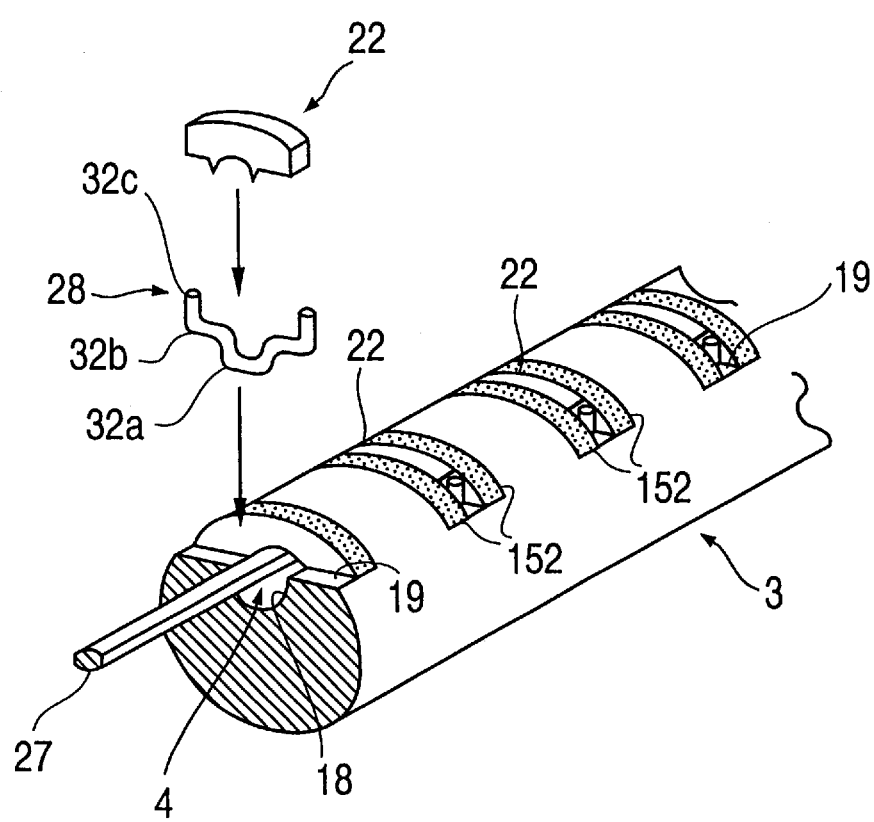
FIG. 16 is a perspective view of a shaft to which the mechanical arrangement according to a fourth preferred embodiment of the present invention is applied, with recesses located along both sides of notches.

FIG. 16 shows a fourth preferred embodiment of the present invention in which a plurality of recesses 152 are provided along both sides of notches 19. Notches 19 have pad members 22 inserted into them. The other components and their arrangements remain identical to those of the mechanical arrangement according to the first preferred embodiment of the present invention.

The recesses 152 serve as oil reservoir means in the same way as the recessed portions provided in the third preferred embodiment of the present invention. Such oil reservoir means allow oil to be retained for a longer period of time between the shafting and the mating bearing portion to which the mechanical arrangement according to the third and fourth preferred embodiments of the present invention is applied.

Figure 17:
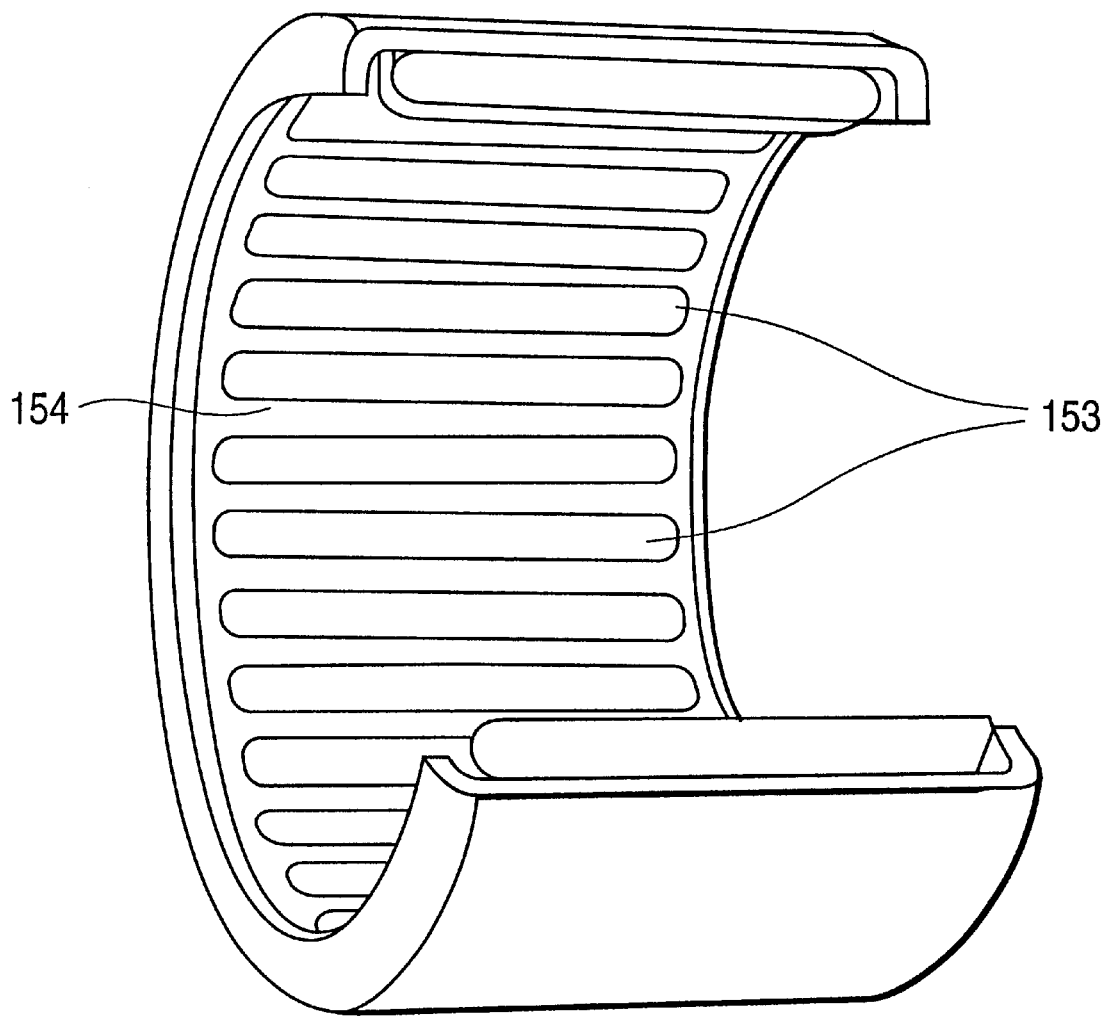
FIG. 17 is a perspective view of a needle, bearing to which the mechanical arrangement according to a fifth preferred embodiment of the present invention is applied.

FIG. 17 shows a fifth preferred embodiment of the present invention in which the mechanical arrangement according to the present invention is applied to a needle bearing. In the needle bearing shown in FIG. 17, lubricant flowing out of the tributary fluid passage of the shaft engaged with the needle bearing is retained in clearances 154 between needles 153. That is to say, the clearances 154 act as oil reservoir means, and this allows the needle bearing and the mating shaft to have their service lives extended.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

I claim:

1. An apparatus for feeding fluid at a minute rate, comprising:

a framing member having an inner circumferential edge portion forming an opening therein;

a disposition plate member having an outer circumferential portion, said disposition plate member being positioned in said opening of said framing member such that said inner circumferential edge portion of said framing member contacts said outer circumferential portion of said disposition plate member, said disposition plate member having notches formed in said outer circumferential portion, said notches extending completely through a height of said disposition plate member so as to form fluid feeding holes between said framing member and said disposition plate member; and a plurality of fluid guide devices located in said fluid feeding holes, each of said fluid guide devices having a cross-sectional area smaller than a cross-sectional area of each of said fluid feeding holes so as to form fluid passages between said fluid guide devices and said fluid feeding holes.

2. The apparatus of claim 1, wherein said fluid guide devices are interconnected so as to form a guide integrating body member.

3. The apparatus of claim 2, wherein said guide integrating body member comprises a first group of wire sections and a second group of wire sections arranged perpendicular to said first group of wire sections, each end of each of said first group of wire sections and each end of each of said second group of wire sections having a bent portion inserted into one of said fluid feeding holes.

4. The apparatus of claim 1, wherein said disposition plate member has a shoulder portion integrally connected to said outer circumferential portion, said notches extending completely through a height of said shoulder portion.

5. The apparatus of claim 1, wherein each of said framing member and said disposition plate member has a rectangular configuration.

6. The apparatus of claim 5, wherein said framing member has a pyramid-shaped guide body extending from a surface thereof so as to project into a fluid feed pipe to be connected to said framing member.

7. The apparatus of claim 1, wherein each of said framing member and said disposition plate member has a rectangular configuration.

8. The apparatus of claim 7, wherein said framing member has a cone-shaped guide body extending from a surface thereof so as to project into a fluid feed pipe to be connected to said framing member.

* * * * *